United States Patent [19]
Gendel

[11] Patent Number: 6,141,459
[45] Date of Patent: Oct. 31, 2000

[54] METHOD AND APPARATUS FOR PROCESSING IMAGE PYRAMID BORDERS

[75] Inventor: Gary A. Gendel, Neshanic Station, N.J.

[73] Assignee: Sarnoff Corporation, Princeton, N.J.

[21] Appl. No.: 08/997,267

[22] Filed: Dec. 23, 1997

Related U.S. Application Data

[60] Provisional application No. 60/059,865, Sep. 24, 1997.

[51] Int. Cl.$^7$ ....................................................... G06K 9/42

[52] U.S. Cl. .......................... 382/256; 382/260; 382/240; 358/445

[58] Field of Search ..................................... 382/256, 254, 382/260, 261, 240, 299; 358/445, 448

[56] References Cited

U.S. PATENT DOCUMENTS

| | | | |
|---|---|---|---|
| 5,325,449 | 6/1994 | Burt et al. | 382/56 |
| 5,359,674 | 10/1994 | Van Der Wal | 382/261 |

*Primary Examiner*—Thomas D. Lee
*Attorney, Agent, or Firm*—William J. Burke

[57] ABSTRACT

A method and apparatus for processing an image by adding a border to the image, where said border has a width that is proportional to the extent of a filter used during image processing. Specifically, the processing reduces an image to produce an image pyramid and expands an image pyramid to produce an image. At each pass through the reduction or expansion process, the border is added to the image being processed, where the border has a width that is at least as large as an extent of a filter used in the reduction or expansion process.

18 Claims, 3 Drawing Sheets

METHOD AND APPARATUS FOR PROCESSING IMAGE PYRAMID BORDERS

CROSS REFERENCE TO RELATED APPLICATION

This patent application claims benefit of provisional patent application Ser. No. 60/059,865, filed Sep. 24, 1997, which is incorporated herein by reference.

The present invention relates to image processing systems and, more particularly, to image processing systems that utilize image pyramids to facilitate processing of images.

BACKGROUND OF THE DISCLOSURE

Image processing systems utilize image pyramids to facilitate efficient and rapid image processing. Image pyramid creation and utilization is well known in the art. For example, U.S. Pat. No. 5,325,449, issued Jun. 28, 1994 and incorporated herein by reference discloses well-known methods of generation and utilization of Laplacian image pyramids. Generally speaking, a pyramid is constructed by successive filtering and subsampling of an image to create another image, i.e., the next level in the pyramid. The successive filtering and subsampling processes are accomplished on each level of the pyramid to create the next sub layer or level. The process for constructing an image pyramid by successive filtering and subsampling is known as image reduction. To insure that all of the image information in one level (parent) is carried to the next layer (child), the filter must extend beyond the image boundaries to ensure that the center of the filter is aligned with the edge most pixel. This ensures that the information within the edge most pixel of the image is filtered and carried into the next level of the pyramid. However, to extend beyond the image boundary without truncation, the image must be circumscribed with a border area. The region of overlap into the border by the filter is known as the filter extent.

Since the border does not exist in the original image, the image must be extended to support the filter extent. The border may be created using a number of different techniques to produce pixels about the edge of the image such as image spreading, image mirroring, or by merely inserting pixels having a constant value. The typical process for generating a pyramid is to fill the border area using one of these methods, apply the filter and subsampling processes, and then repeat the process recursively on the new images in each level of the pyramid until the designated number of levels have been generated. Consequently, a border must be generated around each level of the pyramid to enable the next level to be created.

More specifically, if the filter is, for example, a five-tap filter, the filter has an extent of two. As such, the border must have two pixels extending form the edge pixels in the actual image. Without such an extent, artifacts are generated at the border areas of the image pyramid due to truncation of the filter extent. These artifacts are carried into any image that is subsequently generated by expanding the pyramid into a final image.

In general, the a Laplacian pyramid is generated by building the pyramid using a Gaussian filter having a number of taps, e.g., five. The pyramid can be expanded by expanding a lower level in the pyramid (a child level) and subsequently subtracting the expanded child level image from the parent image (the level above the child). The expansion is accomplished by first filling the border on the child's level, upsampling the pixels of the child level and then filtering the image to create an image the same size as the parent so that the level combining operation e.g., subtraction, can be performed. The process is repeated recursively until the designated levels have been processed to form a final image.

More specifically, assuming a subsample ratio 2 to 1, a pixel in the child image covers four pixels of the parent, i.e., two horizontal by two vertical pixels. For a four pyramid level pyramid, each pixel in the last child image covers 64 pixels, an 8 by 8 pixel area, of the parent image. This means that an error in the value of the pixel at the first border beyond the image in the lowest child level could significantly affect quite a few pixels inside the real image during the expansion process. Typical practice is to make the border large enough to minimize this effect. For example, if a five tap filter for the reduction and expansion process is used, the two pixel filter extent will require a six pixel border by the parent level in order to support the expansion process. A border size is generally defined by the following equation:

Parent Border=((2×Child Border)+filter extent)

As such, starting with a five tap filter having a two pixel extent and a two pixel border for the child the progression of border size is as follows:

Image 1: 2 Pixel Border

Image 2: 6 Pixel Border

Image 3: 14 Pixel Border

Image 4: 30 Pixel Border, and so on.

As can be seen by the foregoing chart the required number of pixels grows dramatically as more levels are used. Consequently, a substantial amount of memory is required to store border pixel values. As such, to ensure that the border pixels are sufficiently accurate to create clear imagery in the final image a substantial amount of border processing is required that increases the overhead of the image processing system. Such overhead requires additional memory which increases the cost of the image processing system.

Therefore, a need exists in the art for a method and apparatus for processing border information that does not require excessive overhead or a substantial amount of memory.

SUMMARY OF THE INVENTION

The disadvantages associated with the prior art image pyramid border processing methods and apparatus are overcome by the present invention. The present invention emulates a border that has an extent of infinity without actually using a border with such an extent. As such, the width of the border is proportional to the extent of the filter. In one embodiment of the invention, a five tap filter used to reduce and expand an image pyramid requires a border having an eight pixel border. While a three tap filter requires a six pixel border. The border width is fixed for each level of the pyramid.

Specifically, the process of the present invention emulates an infinite border while performing a reduction process to produce an image pyramid. The process starts with the original image the invention fills a border appropriately using either a spreading or a filling process. Next, the filter and downsample processing is accomplished upon the image including the border, i.e., the border and original image are treated as a single large image. The resulting pyramid level is spread or filled with additional border pixels that have not been filled by the previous level's filtering operation. The second and third steps are repeated for each subsequent level to produce a complete image pyramid. In effect, the process of the invention implicitly adds border pixels around the image at each reduction step. The size of the border is constrained by the expansion process which, in the current implementation, requires a number of pixels equal to or greater than the filter size plus the filter extent plus 1 at each level.

The present invention also includes a process for expanding an image pyramid where the image including a border is filtered and upsampled. Next, the invention spreads or fills the border not filled by the filtering operation accomplished on the previous step. Then, the invention performs a designated operation between the expanded image and the original level to combine the information in the two levels, i.e., subtraction of the expanded image information from the original image pyramid level information. Lastly, the first, second and third steps are repeated for each subsequent pyramid level until a final image is created containing information from all the levels of the pyramid.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
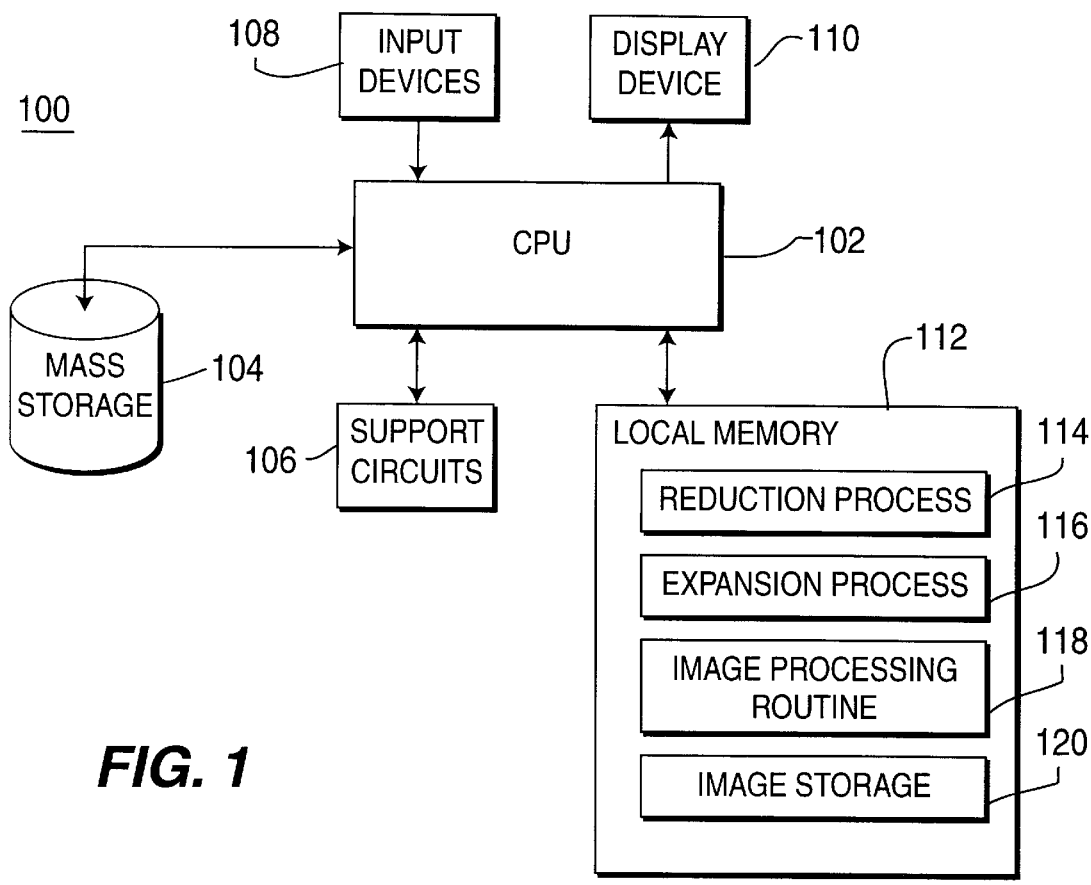
FIG. 1 depicts a general purpose computer system that executes certain programming to cause the computer system to operate as a special purpose computer system to implement the invention.

FIG. 1 depicts a general purpose computer 100 comprising a central processing unit 102, a mass storage device 104, input devices 108, display devices 110, support circuitry 106 and a memory 112. The central processing unit 102 is a general purpose processor that, when programmed by routines stored in either the mass storage device or the memory 112, becomes a special purpose computer system capable of performing the methods of the present invention. The central processing unit 102 is coupled to a mass storage device 104 such as a disk drive, magneto optical storage device, or other form of mass storage. The CPU 102 is also coupled to input devices 108 such as a mouse, keyboard and the like and also a display device 110 such as a computer monitor. Local memory 112 is coupled to the CPU 102 to provide a storage location for the processes and routines of the present invention. In particular, the memory stores a reduction process 114, an expansion process 116, an image processing routine 118, and provides image storage for various levels of pyramids and original images that are being processed by the central processing unit. In addition, the CPU is supported by certain support circuitry that is well known in the art, such as, cache memory, read only memory, power supplies, clock circuits, and the like.

Although the invention herein is being described as being implemented within a general purpose computer system, those skilled in the art will understand that special purpose processors may be utilized to implement the invention, such as, applications specific integrated circuits (ASIC). Additionally, the invention is described as being a method that is implemented on a computer system; however, some of the steps of the inventive routines may be accomplished in hardware as well as in software such that the invention is a combination of hardware and software process steps. As such, the invention should be interpreted as being implemented in hardware, software, or both.

Figure 2:
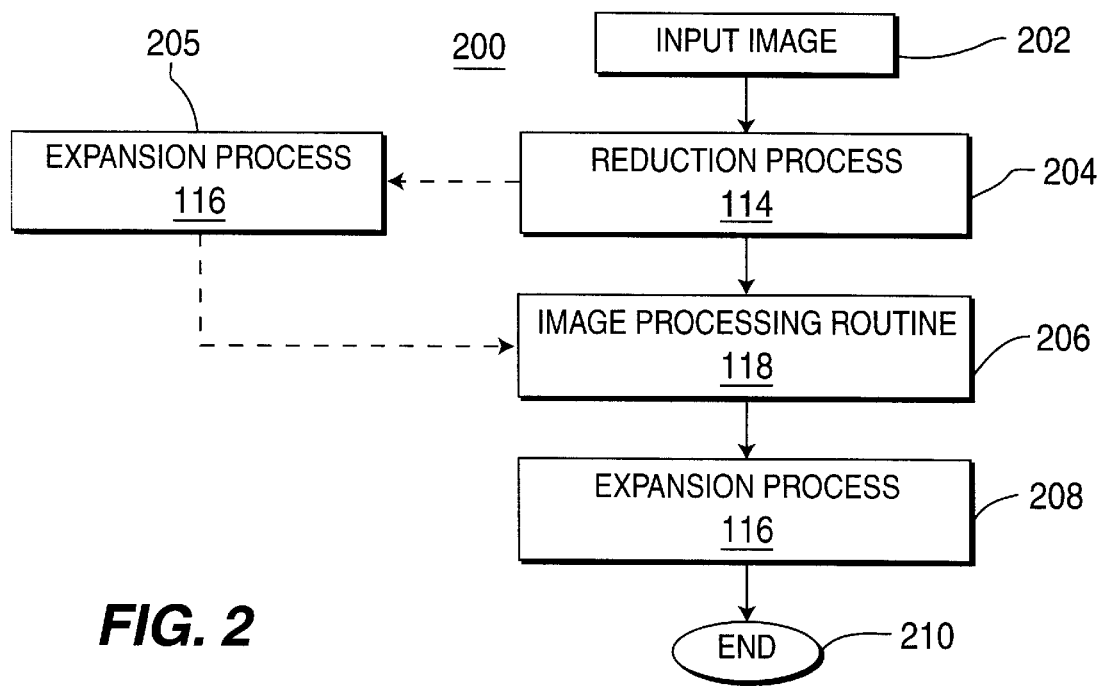
FIG. 2 depicts a flow diagram of a method of image processing in accordance with the present invention.

FIG. 2 depicts a flow diagram of the operation of the inventive methods and apparatus as applied in an image processing system. The routine 200 of the image processing system begins at step 202, with an input of an image, where the input image may be recalled from mass storage, from local memory or be supplied directly from an image source to the processing system. The input image is successively reduced, at step 204, using a reduction process 114 in accordance with the present invention described with respect to FIG. 3 below. The reduction process 114 produces an image pyramid containing a user defined number of levels of filtered and subsampled pixels from the original image. Generally, each level in the image pyramid contains ¼ of the number of pixels that were contained in the previous level (i.e., parent level). At step 206, an image process routine 118 is performed in accordance with known processes to, in some manner, alter or change the image pyramid. Generally, an image is changed into an image pyramid such that the image processing routine 118 can be applied rapidly to the reduced image. Thereafter or while image processing is occurring, an expansion process 116 is applied, at step 208, to the altered image produced by the image process routine. The expansion process 116 expands the pyramid to produce an output image that is similar to the input image but contains the alterations that were performed by the image processing routine 118.

In another embodiment, an expansion process step 205 occurs before image processing step 206. The resulting method is particularly useful for sharpening and alignment applications.

In further embodiments, an image processing routine 118 is not accomplished and the reduction and expansion processes are performed to provide other image processing needs such as image storage efficiency, image searching and/or image compression. However, in most applications for an image pyramid, an image processing process is included in the sequence of steps. The image processing process may be imbedded in the expansion process such as to sharpen an image by filtering a particular layer of an image pyramid as the pyramid is expanded. Alternatively, the expansion process and image processing process may be within a loop to image process and expand certain ones of the pyramid layers or repeatedly process a particular layer. It should be understood that additional applications might require omission of one or more of steps 204–208.

Figure 3:
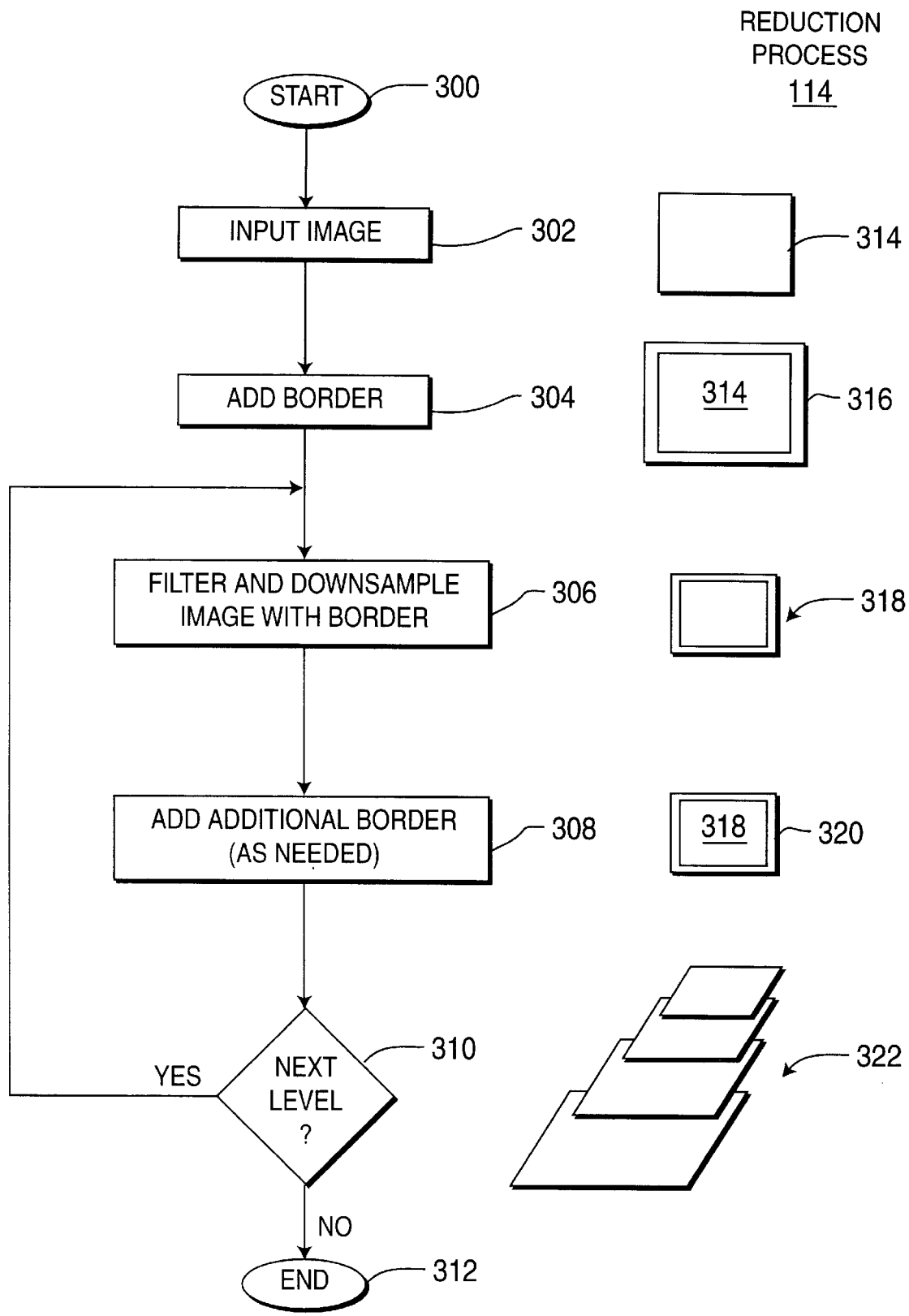
FIG. 3 depicts a flow diagram of a reduction process in accordance with the present invention.

FIG. 3 depicts a reduction process in accordance with the present invention. The reduction process 114 begins at step 300 and proceeds to step 302 wherein an image is input to the process. Generally, the image is recalled from memory and stored in local memory during the processing period. The image is processed at step 304 to add a border entirely encompassing the image. To understand the process of the invention an original image, its border and the pyramid levels are depicted schematically beside the reduction process 114.

The original image is depicted as image 314 and the border area is added as area 316. At step 306, the image and its border which are now considered a single image region are filtered and downsampled in a conventional manner by a conventional subsampling technique.

The filtered and downsampled image 318 is approximately ¼ the size of the original image 314 plus the border 316. Generally, the filter is a low pass filter having multiple taps such as, for example, three taps or five taps. Generally, the border area 316 has a width that is at least equal to the extent of the filter that is used in step 306. As such, if the filter has five taps, the extent of the filter is two pixels and the width of the border area will be at least two pixels. As such, as the filter is moved to the edge pixel of the image 314, the extent of the filter will cover the border area without truncation of information within the image.

More specifically, the border is wide enough to allow the filter to produce a filtered edge pixel and result in at least one unaltered pixel in the border, i.e., a portion of the border is not corrupted by the filtering process. Downsampling corrupts one pixel in the border and, therefore, at least one further pixel is needed beyond the extent of the filter. Thus, for the reduction process, the minimum border width is the extent of the filter plus two pixels. However, the width of the border is further dependent upon the number of pixels that are in the original image 314 or the level of the pyramid being processed. If the number of pixels in the original image or parent image is odd then the border contains n pixels, where N is the extent of the filter plus two pixels. If, however, the number of pixels in the original image or pyramid level image is even, then the border at the right and bottom of the image has N+1 pixels, where N is the extent of the filter plus two pixels. The top and left borders have a width of N pixels. The expansion process requires a slightly larger border width (e.g., two pixels larger), as shall be discussed below. To efficiently process images without computing a border width for every image, the inventive process generally uses a fixed width border that is equal to the worst case width, e.g., the border width necessary to facilitate expansion, for both expansion and reduction.

At step 308, a border 320 is added to circumscribe the decimated image 318. The size of the border that is added is dependent upon the filtering and downsampling that was accomplished in step 306 wherein some border pixels may already exist. Nonetheless, the width of the border is wide enough to at least contain the filter extent plus two pixels.

At step 310, the reduction process 114 queries whether another level of the pyramid is to be computed. If the query at step 310 is affirmatively answered, the routine proceeds back to step 306 wherein the last level that was generated by the process is filtered and downsampled using step 306. If, however, the query at step 310 is negatively answered the routine ends at step 312. The image pyramid 322 that is created by the process of FIG. 3 is depicted as 322.

Generally the border may be generated in any one of the many border generation processes known in the art. Preferably the border is generated by spreading the edge values of the previously generated or original image by replicating the edge value n number of pixels to produce the border. However other forms of edge spreading or filling can be accomplished using mirroring techniques or interpolating techniques. These techniques generate a border that is representative of a multiple number of the pixels inward from the edge of the image. However, mirroring and interpolating techniques generally require more complicated computation to compute the pixel values that are placed in the border. As such, the preferred techniques are to use a constant pixel value to fill the border, or to replicate the edge values of the image to fill the uninitialized border region. The inventive process can be structured to handle either filling or replication without distinction once the initial image plus border is created with the selected technique.

Figure 4:
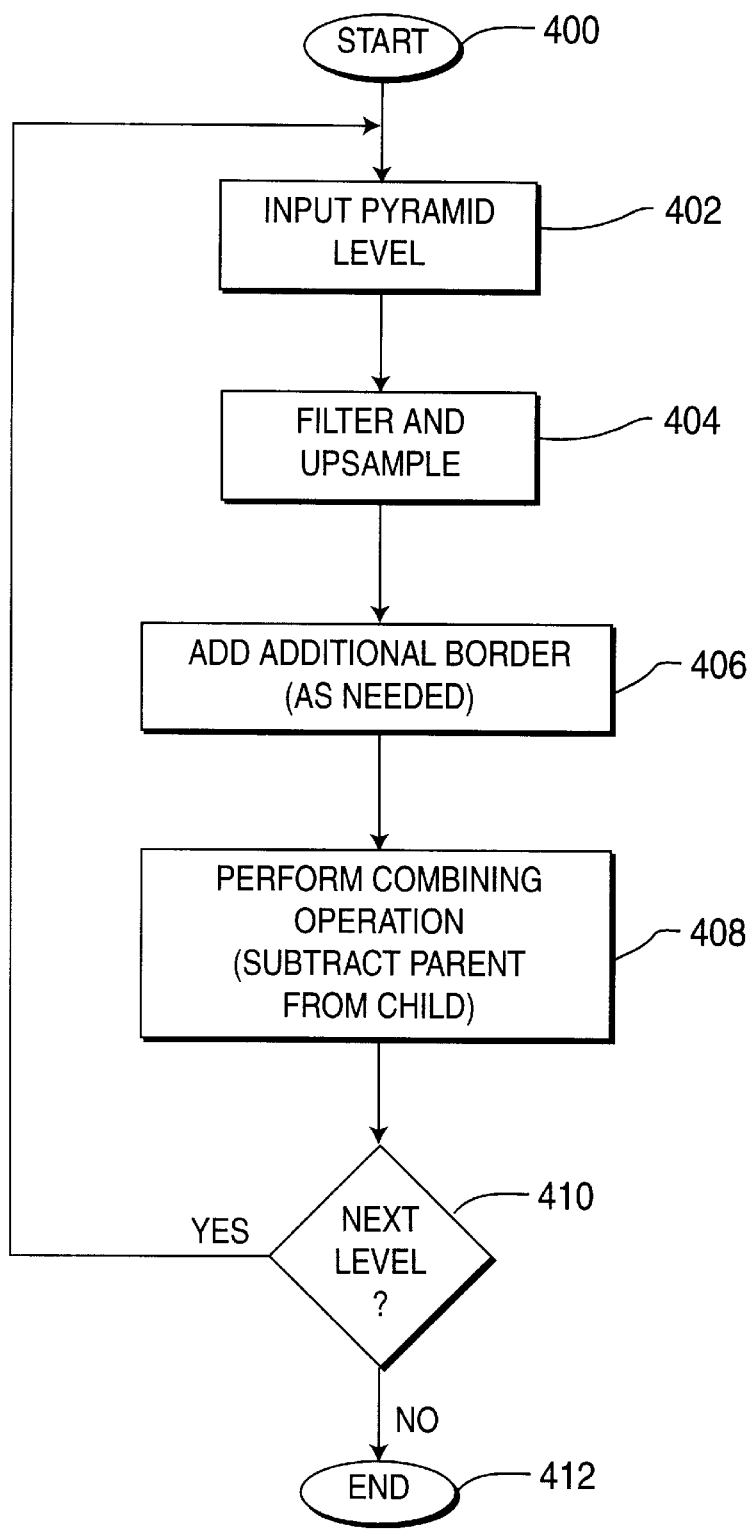
FIG. 4 depicts a flow diagram of an expansion process in accordance with the present invention.

FIG. 4 depicts the expansion process 116 of the present invention. The expansion process is, in essence, the reverse of the reduction process such that an image is upsampled and filtered to create a larger image. This process is generally performed on pyramids created by the reduction process along with intermediary image processing operations that extract characteristics of the images. Specifically, if the expanded image is subtracted from the input image of the equivalent pyramid level, the resulting image comprises energy of a specific frequency band of the original image from which the pyramid was formed. If a Gaussian filter were used for reduction and expansion, the resulting image represents a Laplacian filtering of the image. Subsequently, a pyramid generated by such a process would be a Laplacian pyramid. Expansion of a Laplacian pyramid using addition in place of subtraction would reconstruct the original image from the Laplacian pyramid. This Laplacian pyramid is used commonly in pyramid image processing.

The expansion process 116 begins at step 400 and proceeds to step 402 where a pyramid level input into the routine. Generally, on the first pass through the routine, this pyramid level is the most decimated level of the pyramid, i.e., lowest level. The input images created from the reduction or previous expansion process are consistent in border content for expansion process. If other image processing operations are used besides the reduction or expansion processes described, the operations must process the pixels in the border as if they were part of the image to maintain consistency of values.

At step 404, the selected pyramid level is filtered and upsampled to create a larger image having a size that is approximately the same as the next most decimated image, i.e., a pyramid level that was used to create the lower pyramid level that is now being processed. The filtering an upsampling expands the image level and initializes a border region, i.e., the border of the decimated image becomes apparent. At step 406, additional border is added, as needed, to appropriately size the image for further processing. The amount of border required on the right and bottom edges is determined by the upsampling process. Generally, for 1 to 2 upsampling, this is dependent upon whether the image dimension (number of pixels) of the original image level is odd or even. Once the expanded image is created, an expansion operator of step 408 may be applied between the expanded image and the pyramid level of the same size. Generally, this is a subtraction process where the pyramid level is subtracted pixel-by-pixel from the expanded image. The result of the subtraction becomes the "input" level for the next pyramid level that is processed.

At step 410, the routine 116 queries whether the next level of the pyramid is to be processed. If the query is answered affirmatively, the process proceeds to step 402 wherein the next level in the pyramid is input into the process. However, if the next level of the pyramid is not to be processed the query at step 412 is negatively answered and the routine ends at step 414. Once all of the levels of the pyramid are processed the output from the expansion process is an image containing all of the image information that is represented at the various levels of the pyramid.

If any image processing steps are performed using a filter with a nonzero extent other than the reduction and expansion operations described, borders must be enlarged to encapsulate the spread of the image pixel values into the border regions by the filtering operation to ensure consistency of this process.

Although various embodiments which incorporate the teachings of the present invention have been shown and described in detail herein, those skilled in the art can readily devise many other varied embodiments that still incorporate these teachings.

What is claimed is:

1. A method of reducing an image to produce an image pyramid comprising the steps of:
    (a) adding a border to the image;
    (b) filtering and downsampling the image with the border to create a pyramid level;
    (c) adding additional border, as necessary, to the pyramid level to provide a border that is at least equivalent to the extent of the filter; and
    (d) repeating steps (b) and (c) until a predefined number of pyramid levels are generated.

2. The method of claim 1 wherein said border circumscribes the image.

3. The method of claim 1 wherein the border is a plurality of pixels having values that are generated by replicating a pixel value at an edge of the image or pyramid level.

4. The method of claim 1 wherein the border is a plurality of pixels having the same value.

5. The method of claim 1 wherein a width of the border is defined by a number of pixels in the image or pyramid level that the border is proportional to an extent of the filter.

6. A method of expanding an image pyramid to produce an image comprising the steps of:
    (a) inputting a pyramid level having been formed using a process that placed a border around an image before forming the pyramid;
    (b) filtering and upsampling the pyramid level to produce an expanded image having an initialized border;
    (c) adding additional border, as necessary to initialize portions of the border not initialized by the upsample and filter operation;
    (d) performing an operation upon the expanded image and the pyramid level to combine the information in the expanded image with the information in the pyramid level; and
    (e) repeating steps (a) through (d) until the image pyramid is processed to produce an output image.

7. Apparatus for processing an image comprising: means for adding a border to the image
    means for filtering and downsampling the image with the border to create a pyramid level; and
    means for adding additional border, as necessary, to the pyramid level to provide a border that is at least equivalent to the extent of the filter, wherein said processing means and said filtering and downsampling means are repeatedly utilized until a predefined number of pyramid levels are generated.

8. The apparatus of claim 7 wherein said border circumscribes the image.

9. The apparatus of claim 7 wherein the border is a plurality of pixels having values that are generated by replicating a pixel value at an edge of the image or pyramid level.

10. The apparatus of claim 7 wherein the border is a plurality of pixels having the same value.

11. The apparatus of claim 7 wherein a width of the border is defined by a number of pixels in the image or pyramid level that the border is proportional to an extent of the filter.

12. Apparatus for processing an image pyramid comprising:
    means for inputting a pyramid level having been formed using a process that placed a border around an image before forming the pyramid;
    means for filtering and upsampling the pyramid level to produce an expanded image having an initialized border;
    means for adding additional border, as necessary to initialize portions of the border not initialized by the upsample and filter operation; and
    means for performing an operation upon the expanded image and the pyramid level to combine the information in the expanded image with the information in the pyramid level, wherein said inputting means, said filtering and upsampling means, said adding means and said performing means are repeatedly utilized until the image pyramid is processed to produce an output image.

13. A computer-readable medium having stored thereon a plurality of instructions, the plurality of instructions which, when executed by a processor, cause the processor to perform the steps comprising of:
    (a) adding a border to the image;
    (b) filtering and downsampling the image with the border to create a pyramid level;
    (c) adding additional border, as necessary, to the pyramid level to provide a border that is at least equivalent to the extent of the filter; and
    (d) repeating steps (b) and (c) until a predefined number of pyramid levels are generated.

14. The computer-readable medium of claim 13 wherein said border circumscribes the image.

15. The computer-readable medium of claim 13 wherein the border is a plurality of pixels having values that are generated by replicating a pixel value at an edge of the image or pyramid level.

16. The computer-readable medium of claim 13 wherein the border is a plurality of pixels having the same value.

17. The computer-readable medium of claim 13 wherein a width of the border is defined by a number of pixels in the image or pyramid level that the border is proportional to an extent of the filter.

18. A computer-readable medium having stored thereon a plurality of instructions, the plurality of instructions which, when executed by a processor, cause the processor to perform the steps comprising of:
    (a) inputting a pyramid level having been formed using a process that placed a border around an image before forming the pyramid;
    (b) filtering and upsampling the pyramid level to produce an expanded image having an initialized border;
    (c) adding additional border, as necessary to initialize portions of the border not initialized by the upsample and filter operation;
    (d) performing an operation upon the expanded image and the pyramid level to combine the information in the expanded image with the information in the pyramid level; and
    (e) repeating steps (a) through (d) until the image pyramid is processed to produce an output image.

* * * * *